US010916165B2

(12) United States Patent
Feuer

(10) Patent No.: US 10,916,165 B2
(45) Date of Patent: Feb. 9, 2021

(54) CYBER-ENABLED DISPLAYS FOR INTELLIGENT TRANSPORTATION SYSTEMS

(71) Applicant: Research Foundation of the City University of New York, New York, NY (US)

(72) Inventor: Mark D. Feuer, Colts Neck, NJ (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 15/906,841

(22) Filed: Feb. 27, 2018

(65) Prior Publication Data

US 2018/0247580 A1 Aug. 30, 2018

Related U.S. Application Data

(60) Provisional application No. 62/463,903, filed on Feb. 27, 2017.

(51) Int. Cl.

| | |
|---|---|
| ***G09G 3/14*** | (2006.01) |
| ***G09F 9/33*** | (2006.01) |
| ***G09G 3/20*** | (2006.01) |
| ***G09G 3/3208*** | (2016.01) |
| ***G09G 3/3275*** | (2016.01) |

(Continued)

(52) U.S. Cl.
CPC ................. *G09G 3/14* (2013.01); *G09F 9/33* (2013.01); *G09G 3/2018* (2013.01); *G09G 3/2022* (2013.01); *G09G 3/3208* (2013.01); *G09G 3/3275* (2013.01); *G09G 5/10* (2013.01); *G09G 5/12* (2013.01); *G09G 2300/0452* (2013.01); *G09G 2310/0297* (2013.01); *G09G 2310/06* (2013.01); *G09G 2320/0626* (2013.01); *G09G 2320/0653* (2013.01); *G09G 2354/00* (2013.01); *G09G 2360/145* (2013.01); *G09G 2370/00* (2013.01); *G09G 2370/18* (2013.01); *G09G 2380/06* (2013.01); *G09G 2380/10* (2013.01)

(58) Field of Classification Search
CPC ...... G09G 3/14; G09G 3/2018; G09G 3/2022; G09G 3/3208; G09G 3/3275; G09G 5/10; G09F 9/33
USPC .......................................................... 345/692
See application file for complete search history.

(56) References Cited

U.S. PATENT DOCUMENTS 5,257,020 A * 10/1993 Morse ...................... B60Q 7/02
340/471
6,122,042 A * 9/2000 Wunderman ............ A61B 1/05
356/343

(Continued)

OTHER PUBLICATIONS

Haas, H. et al.; "What is LiFi?", European Conference on Optical Communication; 2015; ECOC2015, paper Th2.3.1.

(Continued)

*Primary Examiner* — Fred Tzeng
(74) *Attorney, Agent, or Firm* — Peter J. Mikesell; Schmeiser, Olsen & Watts, LLP

(57) ABSTRACT

A display system that produces an image that encodes both machine-readable and human-readable data is described. The image has two underlying patterns that are changed at two different rates. The rapidly changing image encodes the machine-readable data and the slower changing image encodes the human-readable data.

19 Claims, 10 Drawing Sheets

(51) Int. Cl.
*G09G 5/10* (2006.01)
*G09G 5/12* (2006.01)

(56) References Cited

U.S. PATENT DOCUMENTS

| | | | | |
|---|---|---|---|---|
| 6,271,815 | B1 * | 8/2001 | Yang | G06F 3/147 340/815.4 |
| 6,445,369 | B1 * | 9/2002 | Yang | G06F 3/147 345/39 |
| 6,683,590 | B1 * | 1/2004 | Pang | G06F 3/147 340/815.45 |
| 7,129,910 | B2 * | 10/2006 | Da Cunha | G06F 3/1446 345/1.2 |
| 7,952,292 | B2 * | 5/2011 | Vegter | H05B 37/02 315/149 |
| 9,042,281 | B2 * | 5/2015 | Miller | G06K 1/18 370/310 |
| 9,100,124 | B2 * | 8/2015 | Pederson | H04B 10/40 |
| 9,294,198 | B2 * | 3/2016 | Pederson | H04B 10/40 |
| 9,413,457 | B2 * | 8/2016 | Pederson | G07C 9/00158 |
| 9,455,783 | B2 * | 9/2016 | Pederson | H04B 10/116 |
| 2003/0030386 | A1 * | 2/2003 | Leeb | H04B 10/1143 315/291 |
| 2012/0268762 | A1 * | 10/2012 | Fischer | G06K 19/077 358/1.13 |

OTHER PUBLICATIONS

Feuer, M. et al.; In-band Management Channel for Lightpaths in Photonic Networks; Technical Digest of the European Conference on Optical Communications; 2004; ECOC2004; paper 3.6.3.

Perli, S. et al.; PixNet: Interference-Free Wireless Links Using LCD-Camera pairs; MobiCom'10; Sep. 20-24, 2010, Chicago, Illinois, USA.

Hranilovic, S. et al.; Short-Range Wireless Optical Communication using Pixelated Transmitters and Imaging Receivers; IEEE Communications Society; 2004; pp. 891-895; IEEE.

Monteiro, E. et al.; Design and Implementation of Color-Shift Keying for Visible Light Communications; Journal of Lightwave Technology; May 15, 2014; pp. 2053-2060; vol. 32, No. 10.

Komine, T. et al.; Fundamental Analysis for Visible-Light Communication System using LED Lights; IEEE Transactions on Consumer Electronics; Feb. 2004; pp. 100-1017; vol. 50, No. 1.

Vaishampayan, V. et al.; An Overlay Architecture for Managing Lightpaths in Optically Routed Networks; IEEE Transactions on Communications; Oct. 2005; pp. 1729-1737; vol. 53, No. 10.

* cited by examiner

```
[HMI frame start]
for section = 1 to 16
        write bit plane 0 to section; illuminate for 1 clock cycle
        write bit plane 1 to section; illuminate for 2 clock cycles
        write bit plane 2 to section; illuminate for 4 clock cycles
        write bit plane 3 to section; illuminate for 8 clock cycles
next section
write 8 dark cycles
for chip = 1 to 15
        for section = 1 to 16
                write chip to section; illuminate for 16 clock cycles
        next chip
        write 8 dark cycles
next section
[HMI frame end]
```

Preamble for 4 lowest bit planes. Dark cycles provide for constant camera capture rate.

Blockwise CWC code with N=15

FIG. 5B

R G B text = [0, 0, 0]
background = [255,255,255]
code rate = 0.00 text = [0, 0, 0]
background = [192,192,192]
code rate = 0.69 text = [224, 224, 32]
background = [32,32,224]
code rate = 0.53

$$\begin{pmatrix} \text{Cam R} \\ \text{Cam G} \\ \text{Cam B} \end{pmatrix} = M \begin{pmatrix} \text{LED R} \\ \text{LED G} \\ \text{LED B} \end{pmatrix}$$

$$\begin{pmatrix} \text{LED R} \\ \text{LED G} \\ \text{LED B} \end{pmatrix} = M^{-1} \begin{pmatrix} \text{Cam R} \\ \text{Cam G} \\ \text{Cam B} \end{pmatrix}$$

$$M^{-1} = \begin{pmatrix} 1.801 & -0.101 & -0.094 \\ -0.198 & 1.184 & -0.334 \\ 0.014 & -1.440 & 2.867 \end{pmatrix}$$

FIG. 9

CYBER-ENABLED DISPLAYS FOR INTELLIGENT TRANSPORTATION SYSTEMS

CROSS-REFERENCE TO RELATED APPLICATIONS

This application claims priority to and is a non-provisional of U.S. Patent Application 62/463,903 (filed Feb. 27, 2017), the entirety of which is incorporated herein by reference.

BACKGROUND OF THE INVENTION

The subject matter disclosed herein relates to electronic displays such as digital signs. Such displays are often found at the roadside or in a commercial environment. A driver can see multiple advertisements or traffic information displayed on the sign. This advertisement or information can change over time according to the preprogrammed nature of the display. The display can easily be reprogrammed with different advertisements or information. Due to the widespread acceptance of these displays it would be advantageous to find further utility for the displays. To date, these signs are customarily only used for a single display-related purpose.

The discussion above is merely provided for general background information and is not intended to be used as an aid in determining the scope of the claimed subject matter.

BRIEF DESCRIPTION OF THE INVENTION

A display system that produces an image that encodes both machine-readable and human-readable data is described. The image has two underlying patterns that are changed at two different rates. The rapidly changing image encodes the machine-readable data and the slower changing image encodes the human-readable data.

In a first embodiment, a method for embedding machine-readable data within a human-readable display such that the machine-readable data remains invisible to humans is provided. The method comprises producing, using a plurality of light-emitting diodes, an illuminated pattern that simultaneously comprises a first optical pattern and a second optical pattern; changing the illuminated pattern over time by changing the first optical pattern at a first rate and changing the second optical pattern at a second rate, wherein the first rate is faster than the second rate such that the first optical pattern is machine-readable but is invisible to humans and the second optical pattern is human readable.

In a second embodiment, a method for embedding machine-readable data within a human-readable display such that the machine-readable data remains invisible to humans is provided. The method comprises producing an illuminated pattern that comprises a first sequence of images and a second sequence of images that change at a first rate and second rate, respectively, such that: the first sequence of images is machine-readable and is changed at the first rate that is greater than 90 Hz such that the first rate is too high for human vision; the second sequence of images is human-readable and is changed at the second rate that is slower than the first rate.

In a third embodiment, a method for embedding machine-readable data within a human-readable display such that the machine-readable data remains invisible to humans is provided. The method comprises producing an illuminated pattern comprising a first sequence of images that is changed at a first rate, such that: the first sequence of images is machine-readable and is changed at the first rate that is greater than 90 Hz such that the first rate is too high for human vision; the first sequence of images is encoded such that viewing by the human eye results in perception of a second sequence of images that is changed at a second rate that is slower than the first rate.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 5B shows pseudocode for performing the hybrid bit-CWC;

FIG. 9 depicts an inversion matrix for addressing blue-green crosstalk.

DETAILED DESCRIPTION OF THE INVENTION

Disclosed herein is a cyber-enabled display (CED) that functions as an information display that simultaneously engages in two modes of communication. In the standard-mode (also referred to as a human-mode), the display shows images, videos or text messages that are meaningful to human viewers. To support the cyber-mode (also referred to as a machine-mode), additional information is encoded into the spatial and temporal dimensions of the displayed images in such a way that the cyber-mode communication is unnoticeable to the human eye. For example, LED (light-emitting diode) arrays can be modulated at rates too high for human vision to perceive thus enabling a cyber-mode. This modulation is arranged so that brightness and color modulation are at lower rates than human vision. The cyber-mode data are recovered by video cameras of the sort routinely provided in smartphones and tablets, and soon to be incorporated in cars as well.

Cyber-enabled displays have a broad range of potential applications including use in intelligent transportation systems. Informational LED displays are widely deployed in public transit systems and over highways, and adding a cyber channel to such displays multiplies their utility and enhances their value. For example, a highway sign could download the full route of a detour into a car's navigation system, or a subway information display could provide translated versions of its content to the smartphones of speakers of many different languages.

Cyber-enabled displays allow a highway operator to pass detailed information to a car, synchronizing the car within an intelligent traffic control system, while simultaneously presenting the car's human occupants with a readable message explaining what is happening. The highway operator does not need to maintain a separate WiFi network which could be overloaded when heavy traffic presents hundreds or thousands of car-clients. The broadcast capability of the cyber-enabled display efficiently handles many simultaneous users, while its line-of-sight operation eliminates any crosstalk with nearby transmitters.

For mass transit applications, cyber-enabled displays can pass much more complex information to transit users than could be displayed on the visible sign itself. Compared to an alternative of using two-dimensional bar codes (such as a QR CODE® system) to direct a users' phone to a web site, the cyber-enabled display offers easy and visible security, since the cyber-enabled display is clearly recognizable as property of the transit authority. Thus, cyber-enabled displays support a natural, tamper resistant interface for authentication which is a cornerstone of secure systems. One interesting application of cyber-enabled display messages is the distribution of public keys that secure radio data links against spoofing (i.e., the practice in which a malicious actor entraps victims by pretending to be a trusted source).

Figure 1:
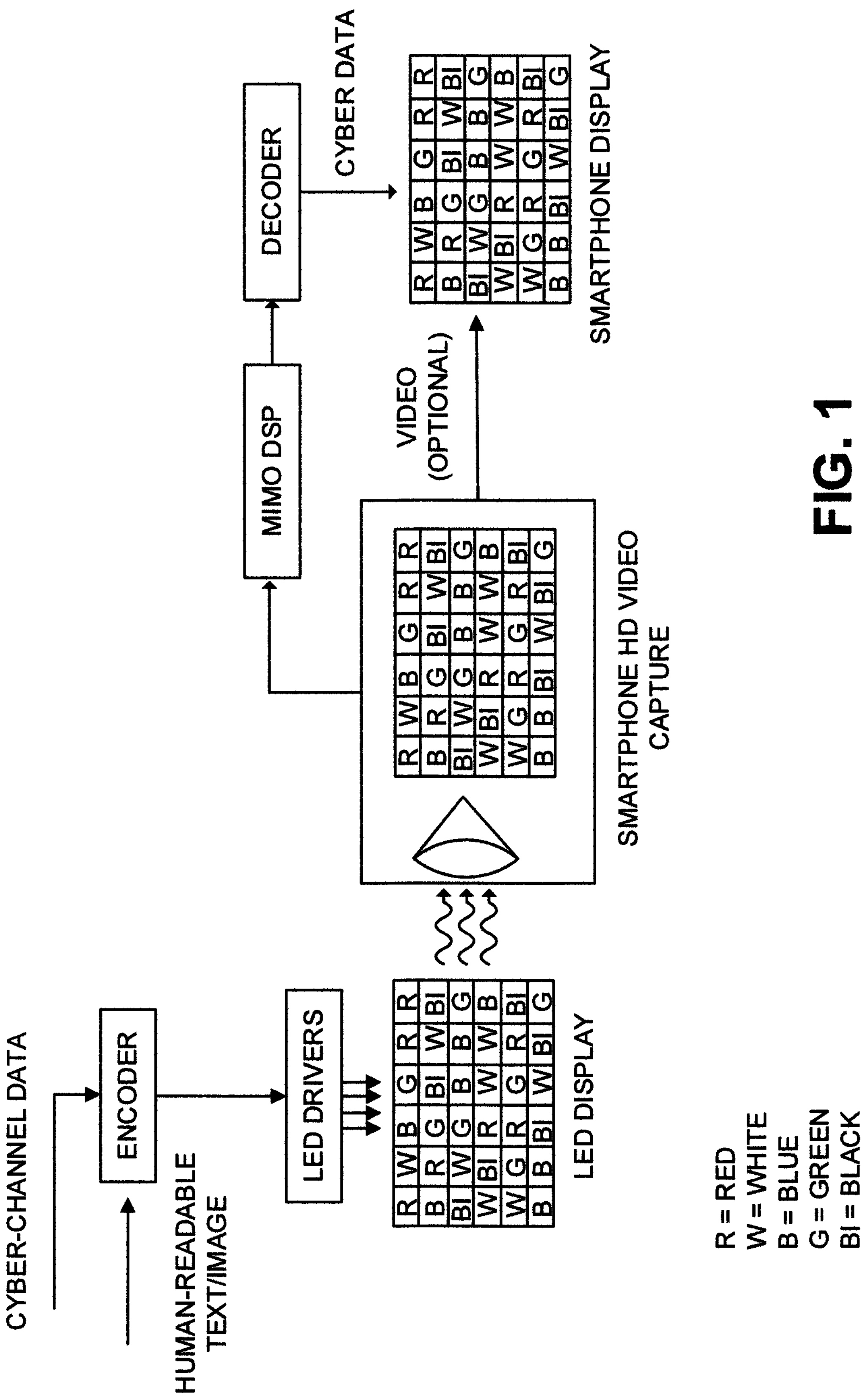
FIG. 1 is a schematic diagram of a communication link based on a Cyber-Enabled Display (CED)

FIG. 1 depicts a conceptual diagram of a cyber-enabled display-based communication link. In the LED display, each display pixel includes a red (R), a green (G), and a blue (B) LED. Importantly, each R, G, or B LED is switched on for a percentage of time that determines its brightness level. This binary switching, closely related to pulse-width modulation (PWM), is desirable for power efficiency. However, if the LEDs were driven with analog current levels, the driver circuits would be expensive and power-hungry. If simple PWM is used to create a human-mode display, there is no flexibility to encode cyber-data. In contrast, appropriate encoding permits switching of R, G, and B diodes to carry cyber-mode data. Thus a 32×32 array of LEDs can transmit binary messages on 3072 parallel channels. These cyber-mode messages are captured by a digital camera which images the LED display. After the cyber-mode messages are decoded into files representing pictures, text or other information, these can be displayed on the smartphone screen. Alternatively, the recovered cyber-mode messages may be used as inputs to a software application.

Camera rotation, impairments in the optical systems or mismatch between LED colors and camera colors could potentially give rise to crosstalk among the massively parallel channels. This can be mitigated by digital signal processing based on MIMO (multiple-input, multiple output) algorithms. Adaptation of these MIMO algorithms may be based on blind adaptation or on training sequences embedded spatially or temporally in the cyber-data stream.

To sustain simultaneous operation in human-mode and cyber-mode, the patterns of 1's and 0's transmitted by each pixel should be carefully controlled so that the color of each pixel, as recognized by the (relatively slow) human eye, is correct. This can be ensured by using constant-weight binary coding (CWC) for the cyber-mode messages. FIG. 2 illustrates the application of constant-weight coding to cyber-enabled displays. The drive waveform for each R, G, or B LED consists of a series of ON-OFF current pulses that express a bit pattern of a constant-weight codeword. The length of each codeword is one video frame, while its weight (i.e., the number of 'ON' pulses during the codeword) determines the brightness of the pixel during that frame. In the example of FIG. 2, six code words are displayed, each having a length of five. The first codeword has a weight of one. The second codeword has a weight of five. The third codeword has a weight of three. The fourth codeword has a weight of three. The fifth codeword has a weight of one. The sixth codeword has a weight of zero.

Figure 2A:
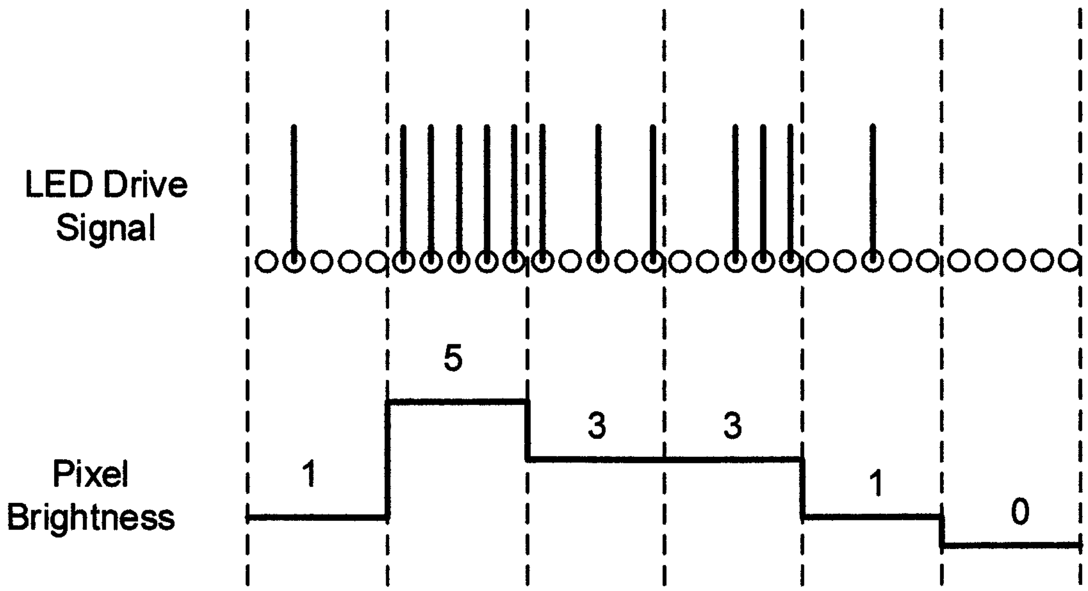
FIG. 2A depicts a drive waveform of a constant-weight coding applied to a single color (R, G, or B) of a single pixel of a Cyber-Enabled Display (CED)
Figure 2B:
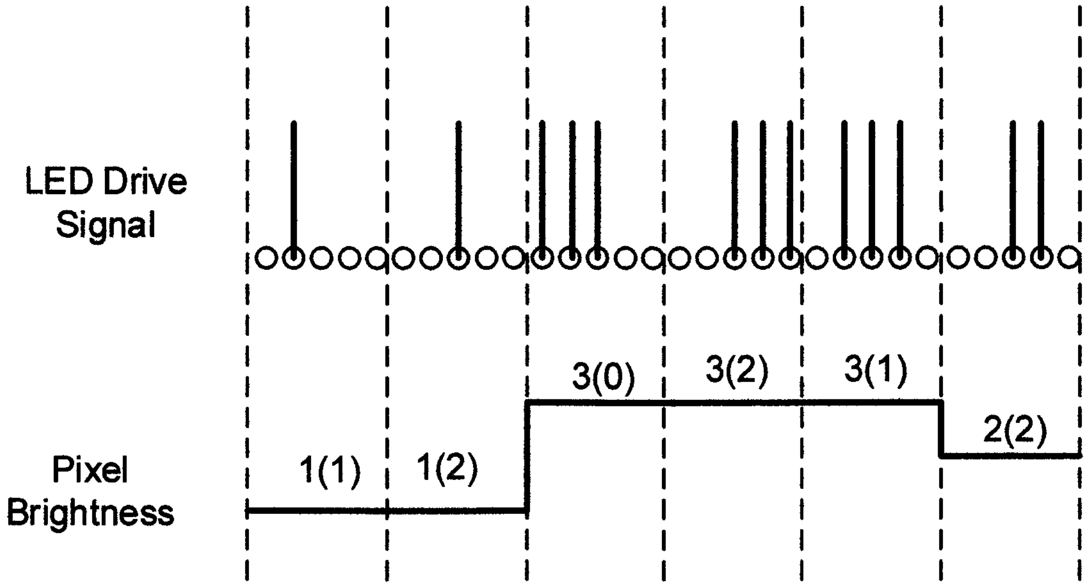
FIG. 2B depicts a drive waveform using pulse-position modulation (PPM)
Figure 2C:
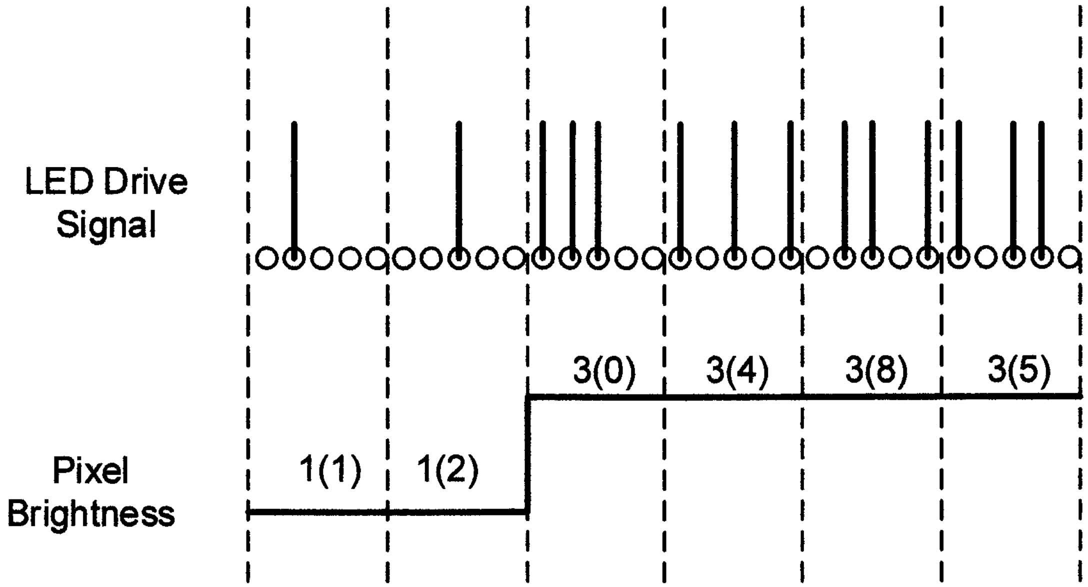
FIG. 2C depicts a drive waveform using constant-weight coding (CWC)

There are many possible codewords for a given length and weight, and the choice among these codewords carries the data of the cyber-mode channel. This fundamentally binary approach preserves the high energy efficiency of the LED driver circuits, in stark contrast to the analog-drive approaches used in most previous research into visible light communication (VLC). For example, the brightness of "three" in FIG. 2A is conveyed in both the third codeword and the fourth codeword but these differ from one another in terms of the position of the pulses. Cyber-data can be embedded in the pulse-position modulation (PPM) which the pulses are sequential (see FIG. 2B) or constant-weight coding (CWC) where the pulses may be non-sequential (see FIG. 2C).

Figure 3A:
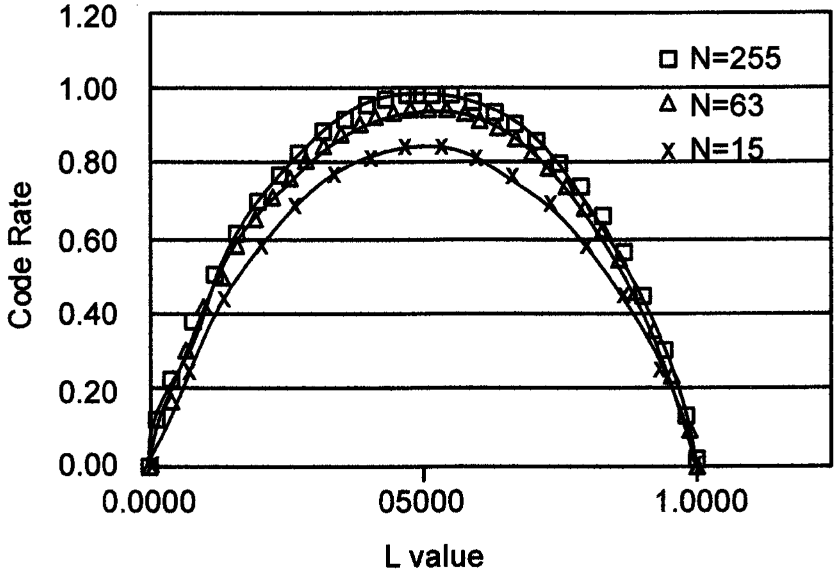
FIG. 3A is a graph depicting the code rate of constant-weight coding for Cyber-Enabled Displays (CEDs)
Figure 3B:
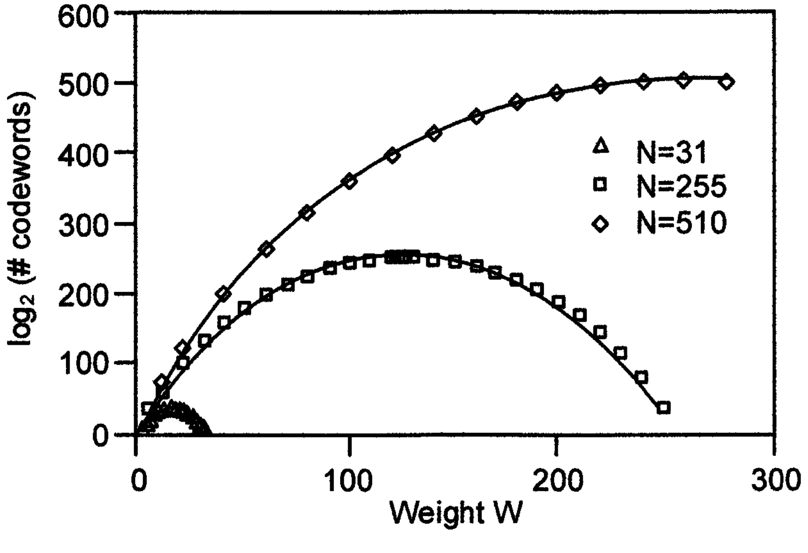
FIG. 3B is a graph depicting the codeword length as a function of weight (W)

The cyber-data transfer rate of the cyber-enabled display system depends on the pixel brightness values. In the example shown in FIG. 2A there is just one possible codeword for a brightness of zero, while there are five possible codewords for a brightness of one and ten possible symbols for a brightness of three. For example, two possible codewords for a brightness of one are given in FIG. 2A as codeword one and codeword five. The bits per codeword X (i.e., the number of payload bits transferred divided by the number of code bits sent) is given by:

$$X = \frac{1}{N}\log_2\left(\frac{N!}{(N-W)!W!}\right) \quad (1)$$

where N is the codeword length (also referred to as a subframe or code chip), W is the codeword weight, and the relative luminance (L) is given by L=W/N. Several distributions are shown in FIG. 3A, for codeword lengths of N=15, N=63, and N=255. The code rate is always maximized for L=0.5, but for any image containing midtone pixels in any color channel, a reasonable fraction of the maximum rate will be possible. In one embodiment the L is between 40% and 60% of maximum luminance (e.g. L is between 0.4 and 0.6). The maximum rate exceeds 98% for N=255. The number of bits per frame, as a function of W, is depicted in FIG. 3B. Each video frame is divided into N subframes. In one embodiment, there are at least 10 subframes per frame. The code weight (W) is the number of "ON" subframes per frame, to the relative brightness (L) of the LED is given by W/N. The number of possible codewords depends on both N and W.

The value N=255 corresponds to 24-bit color, today's standard, and switching of LEDs at rates exceeding 1 Gb per second has been demonstrated. Therefore, a typical highway sign comprising 192×384 RGB pixels could, in principle, transmit more than 70 Tb per second. In practice, typical commercial LED drive (and camera readout) circuitry can cause substantial reductions of this number but this reduction may be mitigated as improved hardware is developed.

Figure 4:
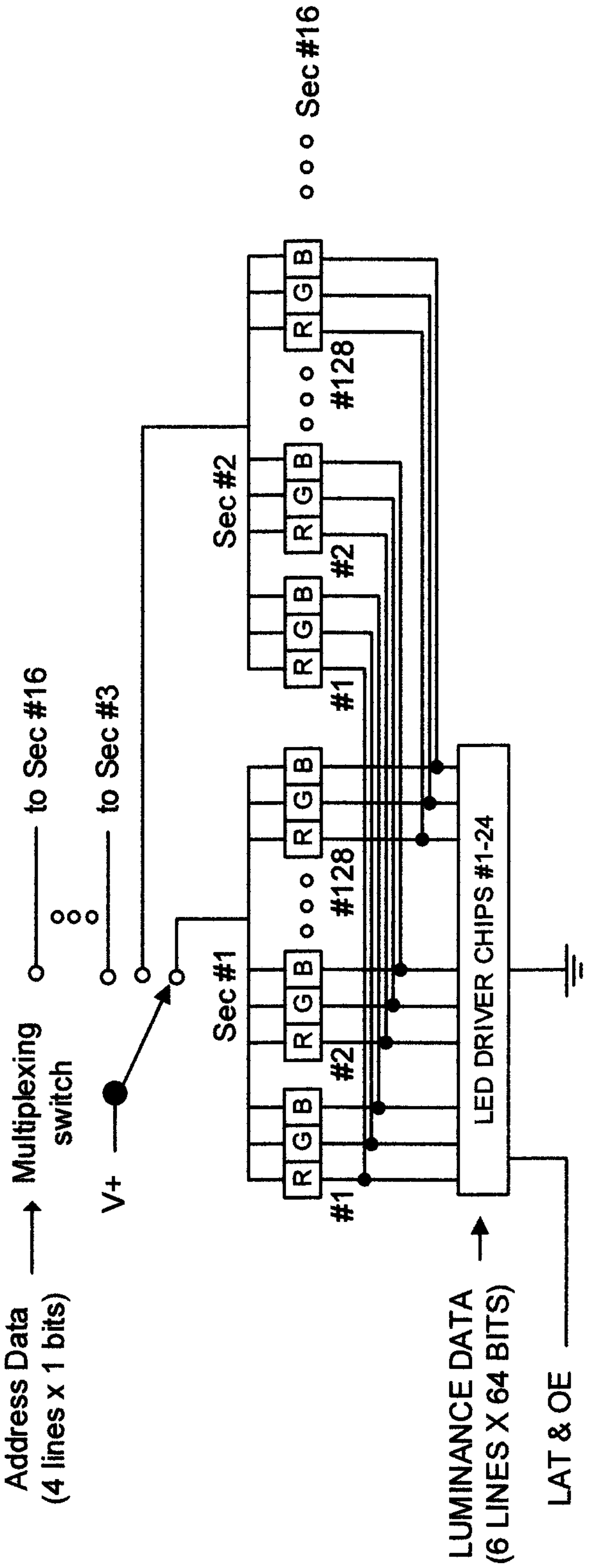
FIG. 4 is a conceptual block diagram of the drive circuitry typical of a 32×64 RGB LED display.

A proof of concept system has been assembled and tested by pairing an inexpensive LED display with 32×64 RGB pixels (ADAFRUIT® #2279) with a CMOS camera (Basler acA2000-340kc). Conventional LED arrays are lit one section at a time in a process called "strobing." This process takes advantage of the intrinsic speed of LEDs and LED drivers to reduce the number of LED driver chips used. Strobing occurs at a pace much faster than the human eye can detect. Conventional drive circuitry, which was designed without the currently disclosed cyber-enabled display in mind, requires a refinement of the basic constant-weight coding. A conceptual diagram of a typical drive circuitry is shown in FIG. 4. The strobing is enabled by use of a multiplexing switch that selects the active section. The ON/OFF data for each, R, G or B LED in a given section is entered on a predetermined number (e.g. six) luminance lines. The active LEDs are illuminated for the time interval set by the optical enable (OE) pulse. For example, writing all subframes for 16 sections with 24-bit color using PWM would use 16×255-4080 write cycles.

In operation, the 32×64 matrix used in the prototype was arranged in sixteen sections, each containing 128 RGB LEDs in two rows. Pixel data for a section is written to six luminance lines, occupying 64 serial bit intervals (clock cycles). Once all luminance data for a section has been sent, the data latch ("LAT") pin is driven HI to load the data into the display buffer. The output enable ("OE") pin is then driven from HI to LO for an interval of time, turning ON all of the R, G, or B LEDs for which a '1' was input. The process is repeated until all sixteen sections have been driven, completing one subframe. In some embodiments, the next section is addressed and its data input started before the LEDs from the previous section have turned off, offering a (slight) speedup due to pipelining.

In the standard practice for driving LED displays, herein called 'bitplane drive', eight nonequivalent subframes with illumination intervals of 1, 2, 4, 8, 16, 32, 64, and 128 clock cycles are used. This bitplane drive scheme allows completion of a full frame of 24-bit color in 9×16×64=9216 clock cycles, but its rigid structure does not permit encoding of any cyber-mode data. An alternative drive scheme is needed to enable cyber-mode operation. In one embodiment, constant-weight-coding (CWC) is used to define 255 equal-length subframes, each illuminated for 1 clock cycle. This implies an HMI frame time of 255×16×64=261120 clock cycles. At a supported clock speed of 25 MHz, the HMI frame rate would be 95.7 frames per second and the maximum code rate would be about 98%. The maximum cyber-data rate would be 3×32×64×255×0.983×(frame rate)=147.5 Mb per second. However, this simple CWC coding reduces the maximum brightness that can be displayed to just 9/255 which is about 3.5% of what is possible with bitplane drive. It also requires a camera capture rate of about 24414 captures per second, which could be quite challenging for low-cost cameras.

To increase the display brightness, a hybrid scheme may be utilized with bitplane drive for bits 0, 1, . . . j of the luminance byte while applying CWC to bits (j+1), (j+2), . . . 7. As an example, consider j=3. Four subframes are used to send the lower bits and fifteen subframes are used to send the upper bits as a CWC codeword of length N=15. At the maximum allowed clock speed of 25 MHz, the HMI frame rate would be 1285.0 frames per second, the maximum code rate would be about 84%, and the maximum cyber-data rate would be 3×32×64×15×0.843×(frame rate)=99.83 Mb per second. Although the cyber data rate is slightly reduced, this advanced hybrid CWC coding improves the maximum brightness that can be displayed, achieving 9/19 which is about 47% of what is possible with bitplane drive. Thanks to the much higher HMI frame rate, it would be acceptable to reduce the clock rate below 25 MHz to permit use of a camera with lower capture rate.

Figure 5A:
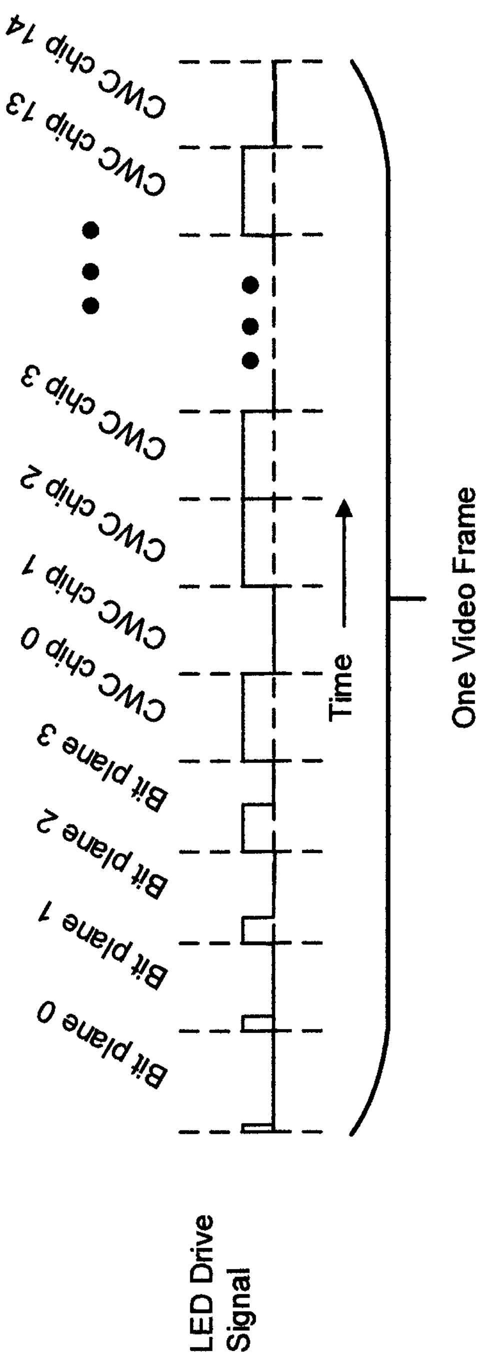
FIG. 5A illustrates a hybrid bit-CWC encoding scheme.

A depiction of hybrid bit-CWC encoding is shown in FIG. 5A. The embodiment shown in this figure uses bit-plane drive for the lowest bit planes (e.g. duration 1, 2, 4, 8) followed by 15 blocks of duration 16 using CWC encoding. The pulse at the beginning of bit plane 0 is shorter than that of bit plane 1. This uses 19 write cycles per section but enables N=15 CWC coding for cyber-data transmission at code rates of about 0.5 to 0.8. The pseudocode of FIG. 5B writes a single human-mode video frame, with encoded cyber-mode data, to an LED panel using hybrid CWC format.

In the first prototype, the actual clock frequency was 1.515 MHz. For convenience, guard times were added between write cycles, leading to a capture rate of 986 captures per second for 640×320 pixel images. The human-mode video was a scrolling text message with foreground color [R, G, B]=[128, 128, 32] and background color [32, 32, 128], resulting in a cyber-data transfer rate of 1.91 Mb per second. Error-free data recovery was achieved. Four crops from sequential captures during one HMI video frame are reproduced as FIG. 6A, FIG. 6B, FIG. 6C and FIG. 6D. There are eight possible pixel colors derived from R, G, B=ON/OFF, rendered as gray values in this monochrome figure. The speckled appearance of both foreground (text) and background regions results from the CWC encoding of the cyber-data. When averaged over a full HMI frame, the human-readable image shows perfectly uniform foreground and background colors, as shown in FIG. 7.

Figure 6A:
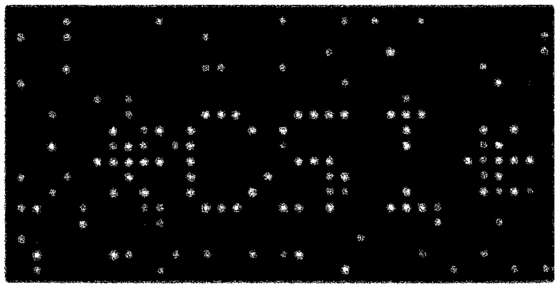
FIG. 6A, FIG. 6B, FIG. 6C and FIG. 6D are representations of image captures from a prototype cyber-enabled display system.
Figure 6B:
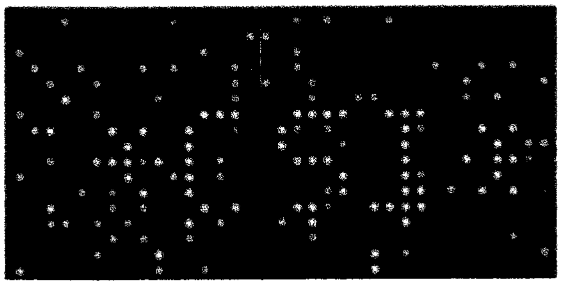
Figure 6C:
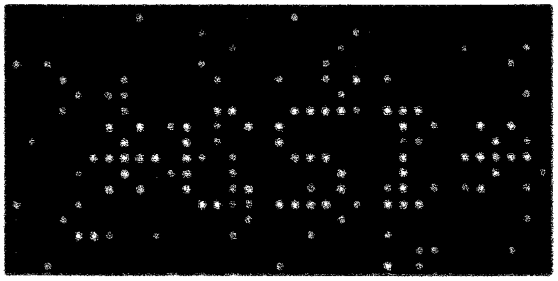
Figure 6D:
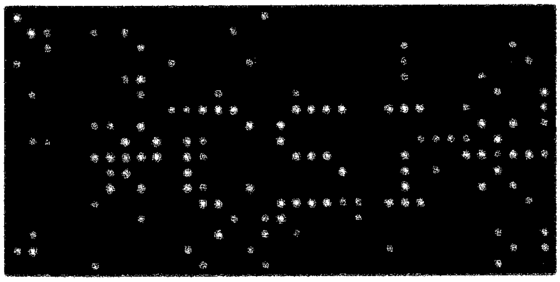
Figure 7:
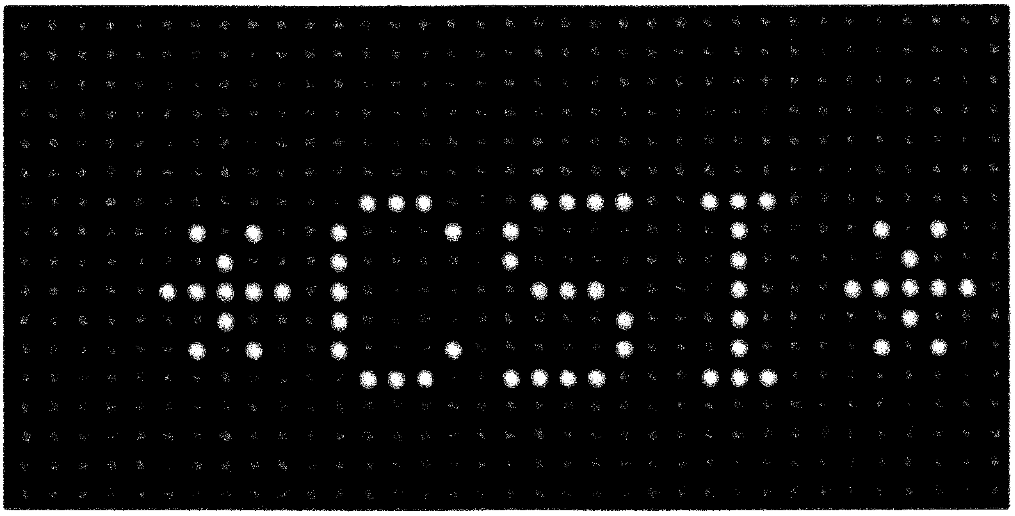
FIG. 7 is a representation of the average of fifteen images in the HMI frame.

In FIG. 6A, an illuminated pattern is presented. The illuminated pattern consists of a first optical pattern and second optical pattern. The illuminated pattern is produced using visible wavelength of light (i.e. 380 nm to 750 nm). The first optical pattern is changed at a relatively rapid rate such that it is machine-readable but is invisible to humans. The second optical pattern is changed at a relatively slow rate such that it is human-readable. In one embodiment, the illuminated pattern is provided from direct emission of an LED array. In another embodiment, the illuminated pattern is indirectly provided from an LED array by being reflected off a surface before the illuminated pattern is ultimately viewed. The changing second optical pattern may be a sequence of images that is perceived as a motion video by the human viewers or may be sequence of images that is perceived as a still image by the human viewers. In one embodiment, the second optical pattern is a text message. The first optical pattern can transmit digital data such as a computer-readable file. In one embodiment, an encryption key is transmitted.

Figure 8A:
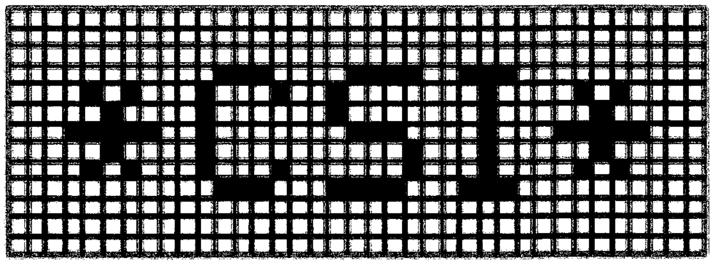
FIG. 8A, FIG. 8B and FIG. 8C depict representations of images with embedded cyber code.
Figure 8B:
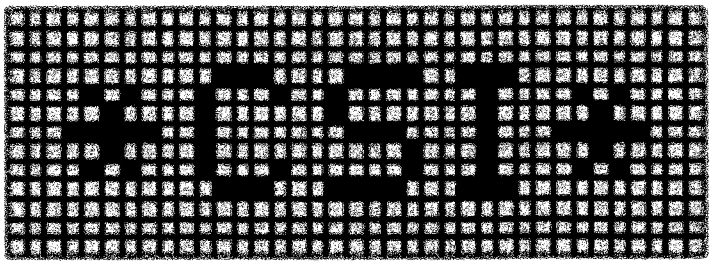
Figure 8C:
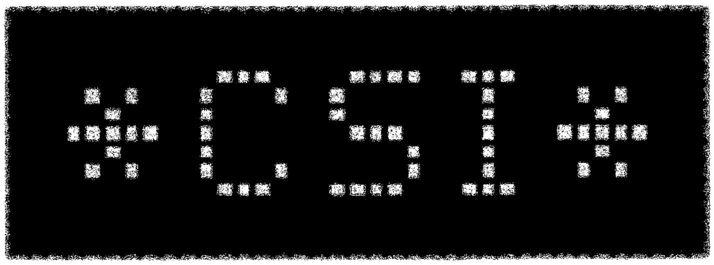

FIG. 8 shows a similar representation that illustrates the cyber-data throughput varies with the actual colors displayed. In FIG. 8A, a black and white image is displayed—the text color is [0,0,0], the background color is white [255,255,255] and the code rate is 0. To achieve a non-zero code rate, at least three different colors are present in the image. FIG. 8B a color image is displayed where the text is black ([0,0,0]) but the background is a gray ([192,192,192]) which produces a code rate of 0.69. An image is considered a color image if more than black ([0,0,0]) and white ([255, 255,255]) are displayed. FIG. 8C is a monochrome rendition of an image where the text is yellow ([244,244,32]) and the background is blue ([32,32,224]) which produces a code rate of 0.53. Most realistic images are comprised of mostly midrange pixels which provide a good code rate.

If the color sensors of the camera are imperfectly matched to the LED colors, a given sensor may detect multiple colors and give rise to crosstalk. For example, the camera may contain a blue sensor that detects emission of a green LED. This is intrinsically a linear effect which can be corrected by a simple inversion of the crosstalk matrix. An example of a matrix inversion process is shown in FIG. 9.

Typical low-cost color cameras capture only one color per image pixel and use interpolation from nearby sensors to estimate what the other two color values should be, a process called Bayer interpolation. For example, at a location including only a Blue sensor, the camera will estimate the Red and Green values from the readings of nearby Red and Green pixels. In a cyber-enabled display, this Bayer interpolation is another source of color crosstalk. The crosstalk due to Bayer interpolation can be reversed in MIMO software before making binary decisions on individual pixels if the system is fully linear, but a better solution is provide a non-interpolated output from the camera.

In addition to the intelligent transportation systems discussed above, cyber-enabled displays might be commercially important for advertising, especially outdoor advertising in the form of LED billboards. The billboards themselves are limited to a few words, but if they were augmented with cyber-enabled display capability, interested readers could instantly download more detailed information, even if a WiFi connection were not available. For example, a bank might download a list of their branch locations and hours, or a restaurant might download promotional coupons, or almost any business might download copies of enthusiastic customer reviews or transmit a Uniform Resource Locator (URL) that directs the user to a predetermined web page.

Although the discussion above refers specifically to binary, constant-weight codes and on-off keying, cyber enabled displays may be implemented using other types of codes and other modulations, including non-binary codes and spectral-shaping codes not based on constant-weight blocks. The key feature is that the signals created by cyber-mode data should contribute minimal spectral components at frequencies in the range visible to humans, which encompasses approximately 0-90 Hz. In one embodiment, the rate is between 0-60 Hz. In yet another embodiment, the rate is between 24-60 Hz. The exact frame rate needed to present a smooth, flicker-free image to the human eye depends on the details of the display format and the moving images to be presented. For example, traditional film-based cinema runs at 24 frames per second (24 Hz). Analog television standards operated at either 25 Hz or 30 Hz (though this is sometimes stated as 50(60) Hz, due to the use of interleaved sub-frames). Modern computer monitors and HDTV sets typically refresh at 60 Hz, and a refresh rate of 120 Hz may be preferred for some fast-moving video games. These higher rates are driven more by the need for spatial resolution than by a perception of temporal flicker. Thus, cyber-enabled displays can present a high-quality human-readable image if the machine-readable data is encoded primarily into frequencies that are (a) above at least 1.5×60=90 Hz and (b) above the HMI frame rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for embedding machine-readable data within a human-readable display such that the machine-readable data remains invisible to humans, the method comprising:

producing, using a plurality of light-emitting diodes, an illuminated pattern that simultaneously comprises a first optical pattern and a second optical pattern;

changing the first optical pattern by switching brightness value of the first optical pattern between different brightness values, the switching occurring at a first rate; and changing the second optical pattern by switching brightness value of the second optical pattern between different brightness values the switching occurring at a second rate, wherein the first rate is faster than the second rate such that the first optical pattern is machine-readable but is invisible to humans and the second optical pattern is human readable;

wherein the step of changing changes the first optical pattern by sending a binary drive waveform to a driver that controls the plurality of light-emitting diodes, the binary drive waveform being selected from a group consisting of (1) a pulse-position modulation (PPM) waveform, (2) a constant-weight coding (CWC) waveform (3) a hybrid waveform comprising frames, each frame having both bit-plane subframes and constant-weight coding (CWC) subframes and (4) a waveform with a plurality of frames, each frame having a plurality of subframes (N), wherein N is at least 15.

2. The method as recited in claim 1, wherein the step of changing the first optical pattern switches the brightness value at a rate greater than 90 Hz by sending the binary drive waveform to the driver that controls the plurality of light-emitting diodes, the binary drive waveform comprising the pulse-position modulation (PPM) waveform.

3. The method as recited in claim 1, wherein the step of changing the first optical pattern switches the brightness value at a rate greater than 90 Hz by sending the binary drive waveform to the driver that controls the plurality of light-emitting diodes, the binary drive waveform comprising the constant-weight coding (CWC) waveform.

4. The method as recited in claim 1, wherein the step of changing the first optical pattern switches the brightness value at a rate greater than 90 Hz by sending the binary drive waveform to the driver that controls the light-emitting diodes, the binary drive waveform comprising the hybrid waveform.

5. The method as recited in claim 4, wherein the constant-weight coding (CWC) subframes include at least 10 subframes per frame.

6. The method as recited in claim 1, wherein the step of changing the first optical pattern switches the brightness value at a rate greater than 90 Hz and the binary drive waveform comprising the plurality of frames, each frame having a plurality of subframes (N), wherein N is at least 15.

7. The method as recited in claim 6, wherein N is at least 255.

8. The method as recited in claim 6, further comprising detecting the first optical pattern with a digital camera.

9. A method for embedding machine-readable data within a human-readable display such that the machine-readable data remains invisible to humans, the method comprising:

producing, using a plurality of light-emitting diodes, an illuminated pattern that simultaneously comprises a first optical pattern and a second optical pattern;

changing the first optical pattern by switching brightness value of the first optical pattern between different brightness values, the switching occurring at a first rate; and changing the second optical pattern by switching brightness value of the second optical pattern between different brightness values, the switching occurring at a second rate, wherein the first rate is faster than the second rate such that the first optical pattern is machine-readable but is invisible to humans and the second optical pattern is human readable;

wherein the step of changing changes the first optical pattern by sending a binary drive waveform to a driver that controls the plurality of light-emitting diodes, wherein the light-emitting diodes are divided into discrete sections and the driver selectively switches between each discrete section with a multiplexing switch.

10. The method as recited in claim 9, wherein the step of changing the first optical pattern switches the brightness value at a rate greater than 90 Hz.

11. A method for embedding machine-readable data within a human-readable display such that the machine-readable data remains invisible to humans, the method comprising:

producing, using a plurality of light-emitting diodes, an illuminated pattern that simultaneously comprises a first optical pattern and a second optical pattern;

changing the first optical pattern by switching color of the first optical pattern between different colors, the switching occurring at a first rate; and changing the second optical pattern by switching color of the second optical pattern between different colors, the switching occurring at a second rate, wherein the first rate is faster than the second rate such that the first optical pattern is machine-readable but is invisible to humans and the second optical pattern is human readable;

wherein the step of changing changes the first optical pattern by sending a binary drive waveform to a driver that controls the plurality of light-emitting diodes, the binary drive waveform being selected from a group consisting of (1) a pulse-position modulation (PPM) waveform, (2) a constant-weight coding (CWC) waveform (3) a hybrid waveform comprising frames, each frame having both bit-plane subframes and constant-weight coding (CWC) subframes and (4) a waveform with a plurality of frames, each frame having a plurality of subframes (N), wherein N is at least 15.

12. The method as recited in claim 11, wherein the step of changing the first optical pattern switches the color at a rate greater than 90 Hz by sending the binary drive waveform to the driver that controls the plurality of light-emitting diodes, the binary drive waveform comprising the pulse-position modulation (PPM) waveform.

13. The method as recited in claim 11, wherein the step of changing the first optical pattern switches the color at a rate greater than 90 Hz by sending the binary drive waveform to the driver that controls the plurality of light-emitting diodes, the binary drive waveform comprising the constant-weight coding (CWC) waveform.

14. The method as recited in claim 11, wherein the step of changing the first optical pattern switches the color at a rate greater than 90 Hz by sending the binary drive waveform to the driver that controls the light-emitting diodes, the binary drive waveform comprising the hybrid waveform.

15. The method as recited in claim 14, wherein the constant-weight coding (CWC) subframes include at least 10 subframes per frame.

16. The method as recited in claim 11, wherein the step of changing the first optical pattern switches the color at a rate greater than 90 Hz and the binary drive waveform comprising the plurality of frames, each frame having a plurality of subframes (N), wherein N is at least 15.

17. The method as recited in claim 16, wherein N is at least 255.

18. The method as recited in claim 16, further comprising detecting the first optical pattern with a digital camera.

19. A method for embedding machine-readable data within a human-readable display such that the machine-readable data remains invisible to humans, the method comprising:

producing, using a plurality of light-emitting diodes, an illuminated pattern that simultaneously comprises a first optical pattern and a second optical pattern;

changing the first optical pattern by switching color of the first optical pattern between different colors, the switching occurring at a first rate; and changing the second optical pattern by switching color of the second optical pattern between different colors, the switching occurring at a second rate, wherein the first rate is faster than the second rate such that the first optical pattern is machine-readable but is invisible to humans and the second optical pattern is human readable;

wherein the step of changing changes the first optical pattern by sending a binary drive waveform to a driver that controls the plurality of light-emitting diodes, wherein the light-emitting diodes are divided into discrete sections and the driver selectively switches between each discrete section with a multiplexing switch.

* * * * *